US005640624A

United States Patent [19]

Lee

[11] Patent Number: 5,640,624

[45] Date of Patent: Jun. 17, 1997

[54] HIGH-SPEED CHARGE FLASH FOR A CAMERA

[75] Inventor: Ki-Yul Lee, Changwon-si, Rep. of Korea

[73] Assignee: Samsung Aerospace Industries, Ltd., Kyeongsangnam-do, Rep. of Korea

[21] Appl. No.: 582,623

[22] Filed: Jan. 4, 1996

[30] Foreign Application Priority Data

Jan. 6, 1995 [KR] Rep. of Korea .......................... 95-174

[51] Int. Cl.[6] .............................. G03B 7/26; H05B 41/14

[52] U.S. Cl. .......................................... 396/205; 315/241 P

[58] Field of Search .......................... 354/145.1; 363/15, 363/16, 34, 37; 315/241 P; 396/176, 205, 206

[56] References Cited

U.S. PATENT DOCUMENTS

| | | | |
|---|---|---|---|
| 4,112,444 | 9/1978 | Yonemoto et al. | 354/106 |
| 4,462,667 | 7/1984 | Fujii et al. | 354/137 |
| 4,623,824 | 11/1986 | Scolari et al. | 515/241 R |
| 5,134,556 | 7/1992 | Courier De Mere | 363/37 |
| 5,136,494 | 8/1992 | Akagi et al. | 363/34 |

*Primary Examiner*—Safet Metjahic
*Assistant Examiner*—Christopher E. Mahoney
*Attorney, Agent, or Firm*—Finnegan, Henderson, Farabow, Garrett & Dunner, L.L.P.

[57] ABSTRACT

A high-speed flash charging system for a camera accelerates flash charging time by storing electrical energy in capacitors in a first charging section when photographing is started after power is applied. When the flash is to be emitted, the system transforms the stored energy and charges a second set of capacitors to be used for powering the flash. After charge is transferred from a capacitor in the first set to the second set, the system determines whether enough charge is present in the second set to activate the flash. If there is not enough charge present, another capacitor from the first set is discharged.

9 Claims, 3 Drawing Sheets

HIGH-SPEED CHARGE FLASH FOR A CAMERA

FIELD OF THE INVENTION

The present invention relates generally to a camera flash charging system. More particularly, the present invention relates to a high-speed flash charging system.

DESCRIPTION OF THE RELATED ART

The quality of a photograph depends heavily on the ambient brightness around the object to be photographed. To compensate for inadequate brightness around an object, one typically uses a camera that emits a light flash for a predetermined period of time. The flash contains a large amount of light at a high color temperature, thus compensating for the inadequate brightness often encountered when taking a photograph at night or indoors.

The camera controls the flash so that it is automatically emitted concurrently with the operation of the camera shutter when the brightness is inadequate. In the case of an automatic camera having a built-in flash, the camera first determines whether the flash needs to be emitted based on the ambient brightness around the object.

FIG. 1 is a block diagram illustrating the construction of a conventional flash system. In FIG. 1, voltage from a power supply 10, such as a battery, is boosted through electromagnetic induction by a boosting section 20, and subsequently used to charge the capacitor 70. A micro-controller (not shown) determines whether the capacitor has an adequate charge for the flash level required. Based on this determination, the micro-controller transmits a driving signal to a trigger section 50. In response to the driving signal, the trigger section 50 discharges the capacitor 70 to the discharge tube 60, thereby ionizing the gas in discharge tube 60 and emitting the flash.

A conventional flash circuit has the disadvantage that it takes a long period of time to charge the capacitor to the high voltage required for operating the flash because the capacitor is charged by the battery and a single boosting section. Accordingly, the capacitor may not be fully charged when a user wants to take a photograph.

SUMMARY OF THE INVENTION

An object of the present invention is to provide a high-speed charge flash system for a camera that overcomes the problem and disadvantages of the conventional device.

To achieve this and other objects and in accordance with the purpose of the invention, as embodied and broadly described herein, a high-speed flash charging system is provided for a camera. The system includes first boosting means for transforming an applied DC voltage into a boosted first AC voltage and for rectifying the boosted first AC voltage; second boosting means for transforming a rectified first AC voltage into a boosted second AC voltage and for rectifying the boosted second AC voltage; and trigger means for outputting a signal indicative of an amount of electrical energy representing a rectified second AC voltage.

The objects and advantages of the invention will be set forth in part in the description which follows, and in part will be obvious from the descriptions or may be learned by practice of the invention. The objects and advantages of the invention will be realized and attained by means of the elements and combination particularly pointed out in the appended claims.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENT

A high-speed charging system for a camera is disclosed. The system includes a first boosting section that uses solid-state switches to switch a power source through inductance coils. This section transforms the signal into a higher voltage AC signal. The AC signal is then rectified and used to charge three capacitors. The first of the three capacitors is then discharged through a boosting section similar to the first boosting section and into a second charge storing section. If there is enough charge in the second charge storing section to take the picture, a flash is emitted. If there not enough charge, the second capacitor, and then if necessary, the third capacitor, is discharged into the second charge storing section.

Reference will now be made in detail to the preferred embodiment of the invention, an example of which is illustrated in the accompanying drawings. Wherever possible, the same reference numbers will be used throughout the drawings to refer to the same or like parts.

Figure 1:
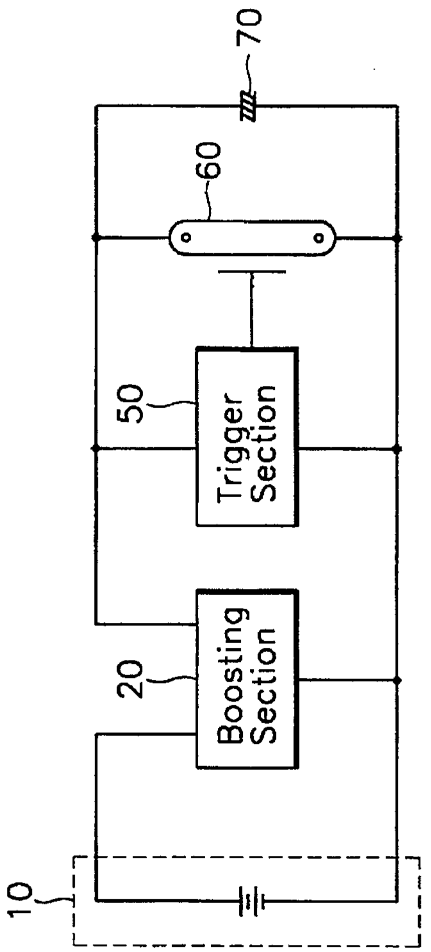
FIG.1 (Prior Art)
FIG. 1 is a block diagram illustrating a conventional flash system.
Figure 2:
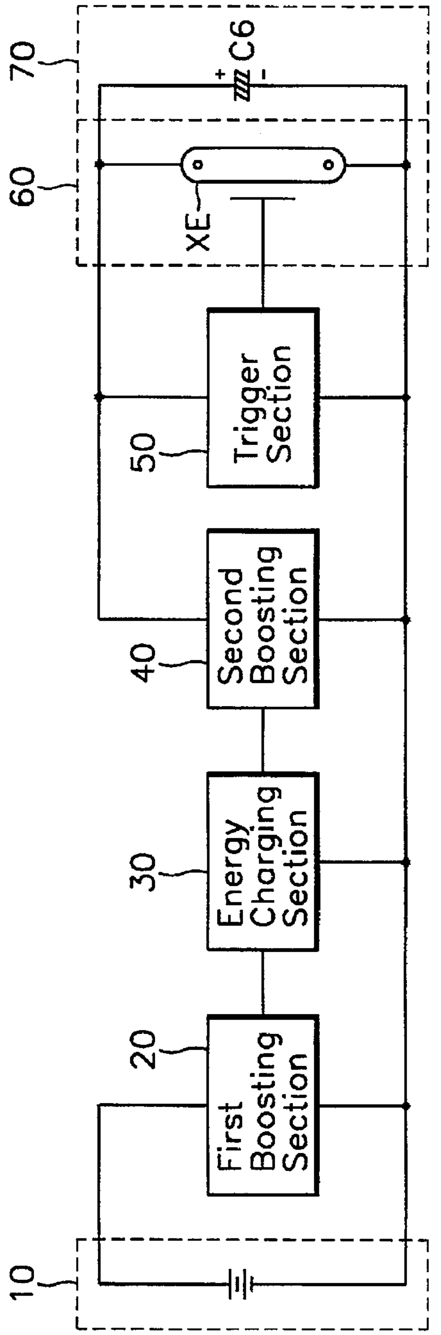
FIG. 2 is a block diagram illustrating a high-speed flash charging system for a camera in accordance with the preferred embodiment of the present invention.

As shown in FIG. 2, a high-speed flash charging system for a camera in accordance with a preferred embodiment of the present invention includes a power supply 10 for supplying a predetermined DC voltage; a first boosting section 20 connected to an output terminal of the power supply 10 for boosting the applied DC voltage to a higher voltage; an energy charging section 30 connected to an output terminal of the first boosting section 20 for charging capacitors to store the produced higher voltage; a second boosting section 40 connected to an output terminal of the energy charging section 30 for boosting the voltage secondarily in response to an applied signal; a trigger section 50 connected to an output terminal of the second boosting section 40; an emitting section 60 connected to an output terminal of the trigger section 50; and a high voltage charging section 70 for storing the high voltage, the charging section being connected to an output terminal of the discharging section 60.

Figure 3A:
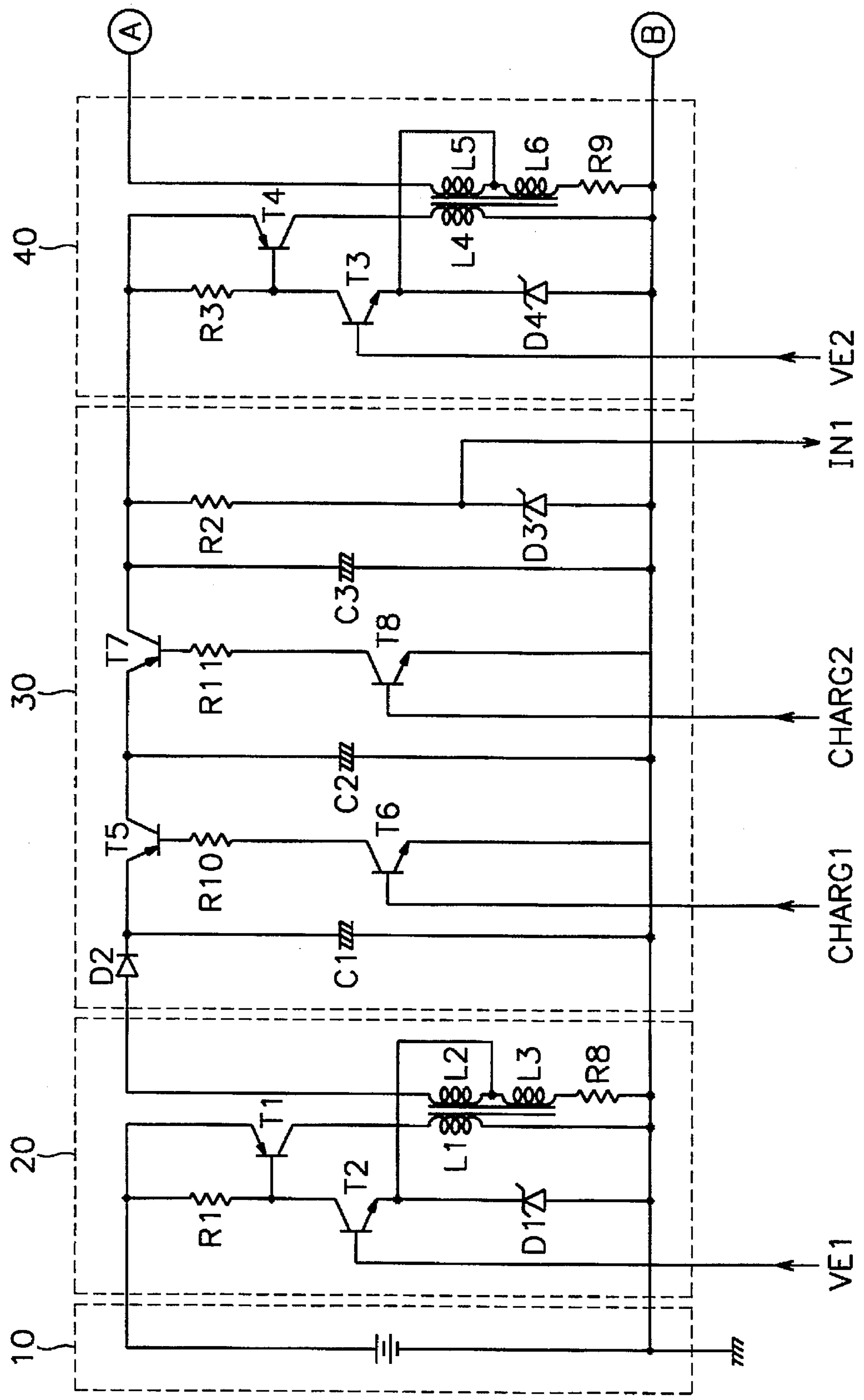
FIGS. 3A and 3B are detailed circuit diagrams of the high-speed flash charging system for a camera in accordance with the preferred embodiment of the present invention.
Figure 3B:
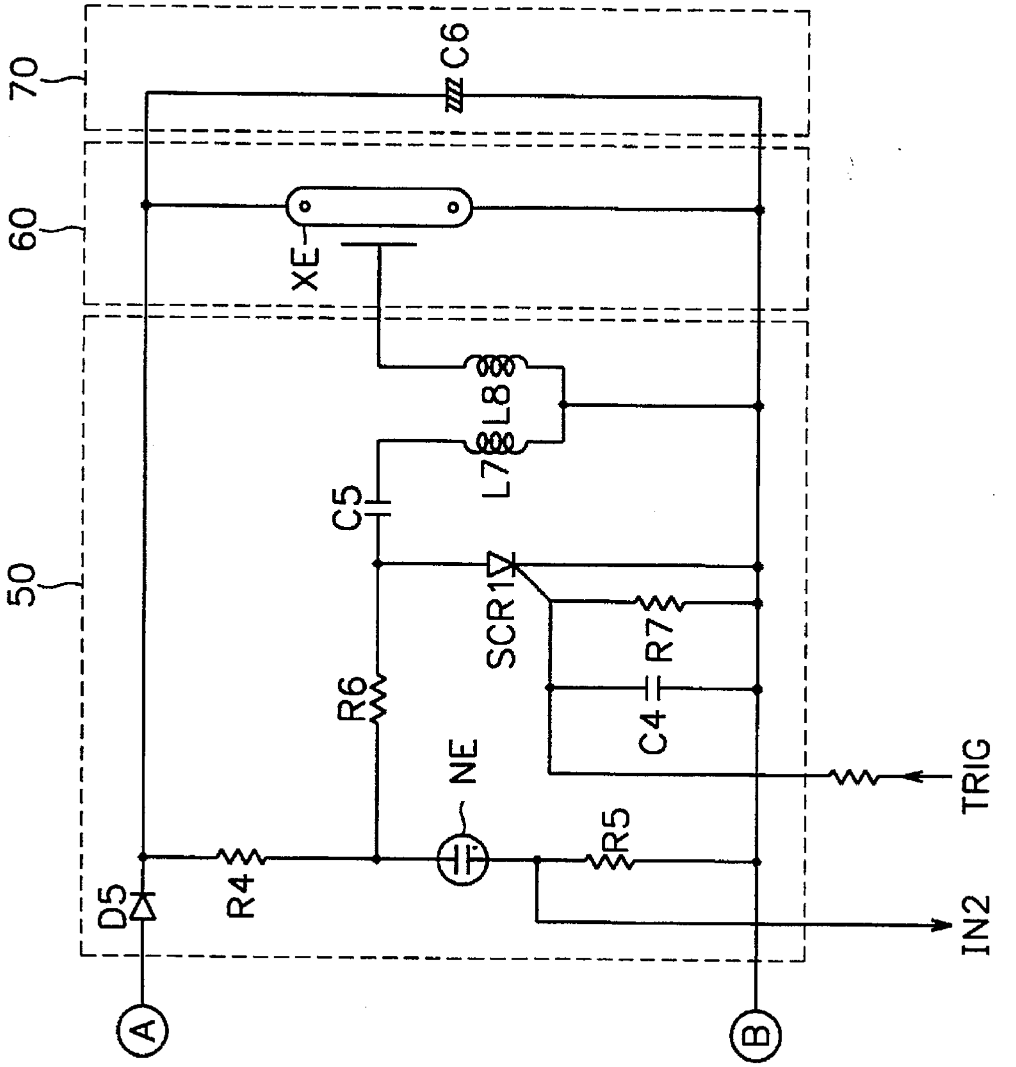

As shown in FIG. 3, the first boosting section 20 according to a preferred embodiment of the present invention includes a transistor T1 with an emitter terminal connected to a power source; a resistor R1 with one terminal connected to the power source; a transistor T2 with a collector terminal connected to the other terminal of the resistor R1 and a base terminal connected to a first boosting terminal VE1; a diode D1 with a cathode terminal connected to an emitter terminal of the transistor T2 and an anode terminal grounded; a first coil L1 with one terminal connected to a collector terminal of the transistor T1 and the other terminal grounded; a second coil L2 with one terminal coupled to diode D2; a third coil L3 with one terminal connected to the other terminal of the second coil L2; and a resistor R8 with one terminal connected to the other terminal of the third coil L3 and the other terminal grounded.

The energy charging section 30 includes a diode D2 with the anode terminal connected to the terminal of the second coil L2; a capacitor C1 with one terminal connected to a cathode terminal of the diode D2 and the other terminal grounded; a transistor T5 with the emitter terminal connected to the cathode terminal of the diode D2; a resistor R10 with one terminal connected to a base terminal of the transistor T5; a transistor T6 with a collector terminal connected to the other terminal of the resistor R10 and a base terminal connected to a first charging terminal input CHARG1; a capacitor C2 with one terminal connected to a collector terminal of the transistor T5 and the other terminal grounded; a transistor T7 with an emitter terminal connected to the collector terminal of the transistor T5; a resistor R11 with one terminal connected to the base terminal of the transistor T7; a transistor T8 with the collector terminal connected to the other terminal of the resistor R11 and a base terminal connected to a second charging terminal input CHARG2; a capacitor C3 with one terminal connected to a collector terminal of the transistor T7 and the other terminal grounded; a resistor R2 with one terminal connected to the base terminal of the transistor T7; and a diode D3 with the cathode terminal connected to the other terminal of the resistor R2 and an anode terminal grounded.

The second boosting section 40 includes a resistor R3 with one terminal connected to the collector terminal of the transistor T7 in the energy charging section 30; a transistor T3 with the collector terminal connected to the other terminal of the resistor R1 and a base terminal connected to a second boosting terminal input VE2; a diode D4 with the cathode terminal connected to the emitter terminal of the transistor T3 and theanode terminal grounded; a transistor T4 with the emitter terminal connected to the collector terminal of the transistor T7 and the base terminal connected to the other terminal of the resistor R3; a first coil L4 with one terminal connected to a collector terminal of the transistor T4 and the other terminal grounded; a second coil L5; a third coil L6 with one terminal connected to the other terminal of the second coil L5; and a resistor R9 with one terminal connected to a terminal of the third coil L6 and the other terminal grounded.

The trigger section 50 includes a diode D5 with an anode terminal connected to the other terminal of the coil L5; a resistor R4 with one terminal connected to a cathode terminal of the diode D5; a neon discharge tube NE with one terminal connected the other terminal of the resistor R4; a resistor R5 with one terminal connected to the other terminal of the neon discharge tube NE and the other terminal grounded; a resistor R6 with one terminal connected to the other terminal of the resistor R4; a thyristor SCR1 with the anode terminal connected to the other terminal of the resistor R6, the gate terminal connected to the trigger terminal input TRIG and the cathode terminal grounded; a resistor R7 with one terminal connected to the gate terminal of the thyristor SCR1 and the other terminal grounded; a capacitor C4 with one terminal connected to the gate terminal of the thyristor SCR1 and the other terminal grounded; a capacitor C5 with one terminal connected to the other terminal of the resistor R6; a first coil L7 with one terminal connected to the other terminal of the capacitor C5 and the other terminal grounded; and a second coil L8 with one terminal connected to the other terminal of the first coil L7.

The energy charging section 30 according to the preferred embodiment of the present invention includes a plurality of capacitors. Preferably, low voltage capacitors with a large capacitance are used.

The emitting section 60 includes a Xenon discharge tube XE. The high voltage charging section 70 includes a capacitor C6 of large capacitance.

The operation of the high-speed charge flash for a camera according to the embodiment of the present invention will be explained hereinafter.

When power is applied to the camera, a micro-controller (not shown) transmits a first boosting signal VE1 to the flash device. The signal turns transistor T2 on which allows current to flow from the base of T1, turning it on also.

When T2 turns on, a high electromotive force is produced in the coil L2 due to electromagnetic induction. Current flows in the coil L3. When the micro-controller turns VE1 off, the transistor T1 is turned off, thereby interrupting the current flow.

The micro-controller transmits charging signals CHARG1 and CHARG2 to the base terminals of the transistors T6 and T8 in the energy charging section 30, thereby also turning on the transistors T5 and T7. The electromotive force produced by the electromagnetic induction is transferred and stored into the first capacitor C1, the second capacitor C2, and the third capacitor C3.

The micro-controller, though line IN1, determines whether the capacitors are charged based on the voltage dropped across the resistor R2.

When the capacitors are charged and a flash is to be performed, the micro-controller produces a second boosting signal VE2 to the second boosting section 40. The transistor T3 in the second boosting section 40 is turned on by the second boosting signal VE2 produced from the micro-controller, thereby also turning transistor T4 on. When T3 and T4 in the second boosting section 40 are on, a charge stored in the third capacitor C3 of the energy charging section 30 is transmitted through the transistor T4 and the coil L6.

When C3 finishes discharging through the transistor T4, the current through T4 is interrupted. At this point, the electromotive force is produced in the coil L5 by electromagnetic induction, which is transferred and stored through diode D5 and into the capacitor C6. Voltage is also stored in the capacitor C5, through the resistors R4 and R6. Further, while charging the capacitors C5 and C6, the electromotive force produced in accordance with the electromagnetic induction is also applied to the neon discharge tube NE by the resistor R4.

The micro-controller, in response to a signal from a charge sensing signal terminal IN2 connected to the other terminal ofthe neon discharge tube NE, determines if capacitor C6 is storing enough charge for a flash. Because the neon discharge tube starts discharging when a voltage corresponding to the discharge starting voltage is applied, the micro-controller can make this determination by sensing when a predetermined voltage is present at IN2.

If the micro-controller determines that the capacitor C6 is not charged enough, the micro-controller transmits the charging signal CHARG2 and the second boosting signal VE2. This turns transistors T7 and T8 on and allows capacitor C2 to discharge into circuits 50, 60, and 70 in a manner similar to the previous discharge of capacitor C2. In particular, the charge on capacitors C5 and C6 increases. When C2 finishes discharging, the microcontroller again determines whether charging is finished based on the signal at IN2.

If charging is still not finished, the above described charging procedure is again initiated by turning on transistors T6, T8, and T3 with input lines CHARG1, CHARG2, and VE2, respectively. Capacitor C1 then discharges, charging capacitors C5 and C6.

When the charging for emitting the flash is finished, the micro-controller produces the trigger signal TRIG for emitting the flash to the trigger section 50.

The TRIG signal causes the current in the coil L7 to be interrupted, which induces a high electromotive force in the second coil L8 that is applied to the Xenon discharge tube XE. At the same time, the charge stored in the capacitor C5 is discharged through the thyristor SCR1.

The flash is emitted as the high voltage charged in the capacitor C6 of the high voltage charging section 70 is discharged by the Xenon discharge tube.

Accordingly, the capacitor C6 can be charged by the boosted voltage at a high speed and the Xenon discharge tube XE ionized in accordance with the driving signal applied from the micro-controller, thereby compensating for insufficient illumination around the object to be photographed. This allows for a photograph having the correct exposure to be taken.

As described above, the present invention has the advantage in that the charging of the driving voltage required for emitting the flash is accelerated. This is advantageous in that it allows for a photograph to be quickly taken, decreasing the chance that an important photographic opportunity will be missed due to insufficient lighting.

It will be apparent to those skilled in the art that various modifications and variations can be made in the camera and method of the present invention without departing from the spirit or scope of the invention. Thus, it is intended that the present invention cover the modifications and variations of this invention provided they come within the scope of the appended claims and their equivalents.

What is claimed is:

1. A high-speed flash charging system for a camera, comprising:

first boosting means for transforming an applied DC voltage into a first AC voltage and boosting the first AC voltage;

first charging means for rectifying the boosted first AC voltage and storing the rectified voltage as electrical energy;

second boosting means for transforming the stored electrical energy into a second AC voltage and boosting the second AC voltage;

second charging means connected to the second boosting means for rectifying the boosted second AC voltage and storing the rectified second AC voltage as second electrical energy;

trigger means for outputting a signal indicative of an amount of the second electrical energy and receiving a signal for initiating flash; and emitting means for discharging a high voltage from the second charging means in response to the signal for initiating the flash.

2. The high-speed flash charging system for a camera according to claim 1, said first boosting means further including:

first switching means for changing operational state in response to a signal from a boosting terminal;

second switching means for changing operational state in response to a signal generated by a resistor in accordance with the operation state of the first switching means; and transforming means for changing operational state in accordance with the operation state of the first switching means and for producing the boosted first AC voltage.

3. The high-speed flash charging system according to claim 1, said first charging means further including a plurality of capacitors each for storing a portion of said electrical energy and discharging the portion of the stored electrical energy independently of the other of the plurality of capacitors.

4. The high-speed flash charging system for a camera according to claim 3, wherein said first charging means further includes:

a first diode having an anode terminal connected to an output terminal of the first boosting means for rectifying the boosted first AC voltage;

a first capacitor from the plurality of capacitors having one terminal connected to a cathode terminal of the first diode;

first switching means connected to the cathode terminal of the first diode, said first switching means changing operational state in response to a signal from a first charging terminal;

a second capacitor from the plurality of capacitors having one terminal connected to a collector terminal of said first switching means;

second switching means connected to an output terminal of the first switching means, said second switching means changing operational state in response to a signal from a second charging terminal;

a third capacitor from the plurality of capacitors having one terminal connected to a collector terminal of said second switching means;

a resistor having one terminal connected to a collector terminal of said second switching means; and a second diode connected to an output terminal of the resistor.

5. The high-speed flash charging system for a camera according to claim 1, said second boosting means further including:

a resistor having one terminal connected to an output terminal of said first charging means;

first switching means connected to an output terminal of the resistor, said first switching means changing operational state in response to a changed signal from a boosting terminal;

second switching means that changes operational state in response to a power signal generated by the resistor in accordance with the operation state of the first switching means; and transforming means that changes operational state in accordance with the operation state of the first switching means and for producing the second AC voltage.

6. The high-speed flash charging system for a camera according to claim 1, wherein said trigger means further includes:

a diode having an anode terminal connected to an output terminal of the second boosting means, and for rectifying boosted second AC voltage;

a resistor having one terminal connected to a cathode terminal of the diode;

a first discharge means connected to the other terminal of the resistor for discharging based on the signal indicative of the amount of the second electrical energy;

switching means having an anode terminal connected to the other terminal of the resistor for changing operational state in accordance with the signal for indicating the flash;

a capacitor connected to the other terminal of the resistor and of which charge/discharge state is changed in accordance with the operation state of the switching means; and transforming means for changing operational state in accordance with the charge/discharge operation state of the capacitor and for producing the high voltage.

7. A high-speed flash charging system for a camera, comprising:

first boosting means for transforming an applied DC voltage into a first AC voltage and boosting the first AC voltage, and for rectifying the boosted first AC voltage;

second boosting means for transforming the rectified boosted first AC voltage into a boosted second AC voltage and for rectifying the boosted second AC voltage; and trigger means for outputting a signal indicative of an amount of electrical energy representing the rectified second AC voltage.

8. The high-speed flash charging system for a camera of claim 7, further comprising emitting means for discharging a high voltage representing said amount of electrical energy in response to a signal for initiating a flash.

9. The high speed flash charging system for a camera of claim 7, wherein said second boosting means includes means for storing the rectified second AC voltage as electrical energy.

* * * * *